United States Patent
Tuff (10) Patent No.: US 8,180,522 B2
(45) Date of Patent: *May 15, 2012

(54) VEHICLE MONITOR

(76) Inventor: Maurice Tuff, Mount Pearl (CA)

(*) Notice: Subject to any disclaimer, the term of this patent is extended or adjusted under 35 U.S.C. 154(b) by 749 days.

This patent is subject to a terminal disclaimer.

(21) Appl. No.: 12/252,884

(22) Filed: Oct. 16, 2008

(65) Prior Publication Data

US 2009/0259361 A1 Oct. 15, 2009

Related U.S. Application Data

(63) Continuation-in-part of application No. PCT/CA2008/000643, filed on Apr. 7, 2008, which is a continuation of application No. 11/733,392, filed on Apr. 10, 2007, now Pat. No. 7,853,375.

(51) Int. Cl.
*G06F 17/40* (2006.01)

(52) U.S. Cl. ............... 701/33.4; 701/32.5; 701/33.2; 702/187

(58) Field of Classification Search ............. 701/1, 29, 701/33, 35, 36, 29.1, 33.2, 33.4, 32.5; 340/441; 702/187

See application file for complete search history.

(56) References Cited

U.S. PATENT DOCUMENTS

| | | | |
|---|---|---|---|
| 4,843,578 A | 6/1989 | Wade | |
| 4,939,652 A | 7/1990 | Steiner | |
| 5,448,561 A | 9/1995 | Kaiser et al. | |
| 5,499,182 A | 3/1996 | Ousborne | |
| 5,550,738 A | 8/1996 | Bailey et al. | |
| 5,758,300 A | 5/1998 | Abe | |
| 5,797,134 A | 8/1998 | McMillan et al. | |
| 6,064,970 A | 5/2000 | McMillan et al. | |
| 6,075,454 A | 6/2000 | Yamasaki | |
| 6,141,610 A | 10/2000 | Rothert et al. | |
| 6,240,773 B1* | 6/2001 | Rita et al. ............... | 73/114.01 |
| 6,263,268 B1 | 7/2001 | Nathanson | |
| 6,278,921 B1 | 8/2001 | Harrison et al. | |
| 6,629,029 B1 | 9/2003 | Giles | |
| 6,701,234 B1* | 3/2004 | Vogelsang ............... | 701/35 |
| 6,832,141 B2 | 12/2004 | Skeen et al. | |
| 6,865,457 B1 | 3/2005 | Mittelstead et al. | |
| 6,868,386 B1 | 3/2005 | Henderson et al. | |
| 6,895,310 B1 | 5/2005 | Kolls | |

(Continued)

FOREIGN PATENT DOCUMENTS

CA 2720857 10/2008

(Continued)

OTHER PUBLICATIONS

European Search Report, dated Mar. 30, 2010.

(Continued)

*Primary Examiner* — Paul N Dickson
*Assistant Examiner* — Timothy Wilhelm
(74) *Attorney, Agent, or Firm* — Bereskin & Parr LLP/S.E.N.C.R.L., s.r.l.

(57) ABSTRACT

A system and method is disclosed for monitoring a motor vehicle. The system includes a sensor unit for collecting at least one vehicle statistic and a portable device for displaying the vehicle statistics. The portable device requests the vehicle statistics from the sensor unit at regular intervals or in response to a particular event and displays statistics on a built-in display screen. In one embodiment, the portable device may be attached to the keys used to operate the vehicle being monitored.

20 Claims, 9 Drawing Sheets

U.S. PATENT DOCUMENTS

| | | | |
|---|---|---|---|
| 6,931,309 B2 * | 8/2005 | Phelan et al. | 701/1 |
| 6,972,668 B2 * | 12/2005 | Schauble | 340/438 |
| 7,363,149 B2 | 4/2008 | Klausner et al. | |
| 7,504,931 B2 * | 3/2009 | Nguyen | 340/426.36 |
| 7,671,727 B2 * | 3/2010 | Flick | 340/466 |
| 7,712,670 B2 * | 5/2010 | Sauerwein et al. | 235/472.02 |
| 7,853,375 B2 * | 12/2010 | Tuff | 701/33 |
| 2002/0018513 A1 | 2/2002 | Curry et al. | |
| 2003/0182033 A1 * | 9/2003 | Underdahl et al. | 701/29 |
| 2004/0083041 A1 | 4/2004 | Skeen et al. | |
| 2005/0096809 A1 | 5/2005 | Skeen et al. | |
| 2005/0146458 A1 | 7/2005 | Carmichael | |
| 2006/0220806 A1 * | 10/2006 | Nguyen | 340/426.36 |
| 2006/0229777 A1 | 10/2006 | Hudson et al. | |
| 2007/0262848 A1 | 11/2007 | Berstis et al. | |
| 2008/0042489 A1 | 2/2008 | Lewis | |

FOREIGN PATENT DOCUMENTS

| | | |
|---|---|---|
| DE | 195 22 937 A1 | 1/1996 |
| DE | 100 55 059 A1 | 5/2002 |
| DE | 20 2004 001 207 U1 | 4/2004 |
| DE | 202004011207 U1 | 4/2005 |
| DE | 10 2006 011 704 A1 | 10/2006 |
| EP | 0239066 | 9/1987 |
| EP | 2145319 A1 | 10/2008 |
| WO | WO03034089 | 4/2003 |
| WO | 2008122121 A1 | 10/2008 |

OTHER PUBLICATIONS

CarChip® Installation Instructions for Models 8211, 8221 and 8225.

Davis Instruments, CarChip®, CarChip E/X, CarChip E/X With Alarm, OBDII—Based Vehicle Data Logger and Software, Rev. B, Feb. 23, 2007.

Davis Instruments, carchip™ What if you could read your car's mind?, 2002.

Applied Expert Systems Inc. (APEXS, Inc.) V-Count 2 Set-up Procedures Vehicle & Driver Safety Monitor.

Applied Expert Systems Inc. (APEXS, Inc.) Vehicle Speed Monitor VSM V-Count II Reed Switch (RS) Installation Guide, 2003.

Davis Instruments Corp, Davis DriveRight® VSS Installation Guide, Product No. 8155VSS, 8155VF, 8160VSS, 8160VF, Rev. D Manual (Jul. 18, 2001).

European Examination Report for European Application No. 08 748 104.0-2211, dated Dec. 6, 2010.

European Examination Report for European Application No. 08 748 104.0-2211, dated Jul. 13, 2010.

International Search Report for International Application No. PCT/CA2008/000643, dated Jul. 29, 2008.

European Exam Report corresponding to EP application No. 08748104.0, dated Nov. 3, 2011.

* cited by examiner

VEHICLE MONITOR

CROSS-REFERENCE TO RELATED APPLICATION

This application is a continuation-in-part of pending PCT International Application PCT/CA2008/000643, with an international filing date of Apr. 7, 2008, which claims priority from pending U.S. application Ser. No. 11/733,392, filed Apr. 10, 2007, which are incorporated by reference herein in their entirety.

FIELD

The embodiments described herein relate to a system and method for vehicle monitoring and more particularly to a system and method for collecting and displaying vehicle statistics.

BACKGROUND

With more young drivers getting licenses each year, there has been an unfortunate increase in accidents along with the ensuing damage, debilitating injuries and sometimes death. Most of these accidents are attributable to speeding and general poor driving habits. In North America, automobile accidents are currently the number one killer of teenagers. Moreover, the economic impact of these accidents is paid for by all drivers through increased insurance premiums. If parents and guardians had a way of monitoring the driving habits of minors they could take appropriate action in response to reckless driving. Furthermore, knowing that a parent or guardian was monitoring their driving habits might make a minor less likely to drive recklessly in the first place. There are also other situations in which the owner of a vehicle may wish to monitor the use of the vehicle, such as when a corporate vehicle is driven by an employee or a rental vehicle is driven by a customer.

There are a number of ways in which vehicle statistics, such as speed and distance, may be tracked. For instance, speedometers, accelerometers, GPS technologies and OBD-II ports are currently available in some or all vehicles. OBD-II ports, for example, are available in all post-1996 vehicles. An OBD-II port is a standardized digital communications port designed to provide real-time data regarding vehicle functioning in addition to a standardized series of diagnostic trouble codes. This data may be collected by connecting a device to the OBD-II port which is capable of communicating using, for example, the SAE J1850 standard.

A number of products have been introduced which take advantage of available vehicle data collection technologies in order to allow vehicle operation to be monitored. However, many of these products are not very convenient to use and often all or part of the device must be connected to a computer before the vehicle statistics can be accessed.

SUMMARY

In one aspect, a process is provided for monitoring a vehicle during operation. The process comprises polling the vehicle for vehicle data using a sensor unit provided to the vehicle; calculating a vehicle statistic from the vehicle data using the sensor unit; updating a memory of the sensor unit with the vehicle statistic; repeating polling, calculating, and updating periodically during operation of the vehicle; wirelessly requesting and receiving the vehicle statistic from the memory using a processor provided in a portable device; and displaying the vehicle statistic on a display provided in the portable device.

In another broad aspect a system is provided for monitoring a vehicle. The system comprises a sensor unit configured to collect a vehicle statistic, and a portable device. The portable device comprises a processor configured to request and receive the vehicle statistic from the sensor unit, a display configured to display the vehicle statistic, and a transceiver configured to wirelessly communicate with the sensor unit. For example, the sensor unit may collect the vehicle statistic by polling the vehicle for vehicle data, calculating the vehicle statistic from the vehicle data, and storing the vehicle statistic.

In another aspect, a system is provided for monitoring a vehicle, the system comprising a sensor unit for collecting at least one vehicle statistic and a portable device. The portable device comprises a processor configured to control the portable device and request and receive the at least one vehicle statistic from the sensor unit; a display for displaying at least one of the at least one vehicle statistic; and a transceiver configured to communicate with the sensor unit.

In another aspect, a portable device is provided for displaying at least one vehicle statistic for a vehicle. The portable device comprises a transceiver configured to communicate with a sensor unit that collects at least one vehicle statistic; a processor configured to control the portable device and request and receive the at least one vehicle statistic; and a display for displaying at least one of the at least one vehicle statistic. The portable device is a handheld device.

Processes and systems in accordance with these broad aspects may be advantageous because the portable device may provide real-time feedback to a user. That is, as the sensor unit repeatedly polls the vehicle for data, calculates the vehicle statistic, and updates the memory, the memory generally contains an up-to-date vehicle statistic. Accordingly, when the portable device requests the vehicle statistic, it receives the up-to-date vehicle statistic. For example, the sensor unit may poll the vehicle for data, calculate the vehicle statistic, and update the memory about every 2 seconds or less. Accordingly, when the portable device requests, receives, and displays the vehicle statistic, the displayed statistic reflects data that was collected within 2 seconds of being displayed.

Further, processes and systems in accordance with these broad aspects may be advantageous because the hardware required to poll the vehicle and calculate the vehicle statistic is provided in the sensor unit, and the sensor unit and the portable device are provided as separate units. Accordingly, the portable device may remain relatively small, and may, for example be mounted to a key of the vehicle. This may allow for ease of use, as a user may not be required to remember to bring the portable device into the vehicle if the portable device is mounted to the vehicle keys. Further, in instances when a parent or guardian is using the process and system to monitor the driving habits of a child, the parent or guardian may simply give the keys of the vehicle, to which the portable device is mounted, to the child, and then later, receive the keys and the portable device back from the child. Upon receiving the keys, the parent may immediately view the display to see the statistics. Further, upon giving the keys to the child the next time the child drives, the parent may view the statistics that were collected the last time the child drove. Alternately, the parent may view the statistics during operation of the vehicle.

Further, processes and systems in accordance with these broad aspects may be advantageous because the sensor unit may be generally fixedly attached to the vehicle. Accordingly, a user may not be required to attach or detach the sensor unit to the vehicle each time the sensor unit and portable device are used.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1A:
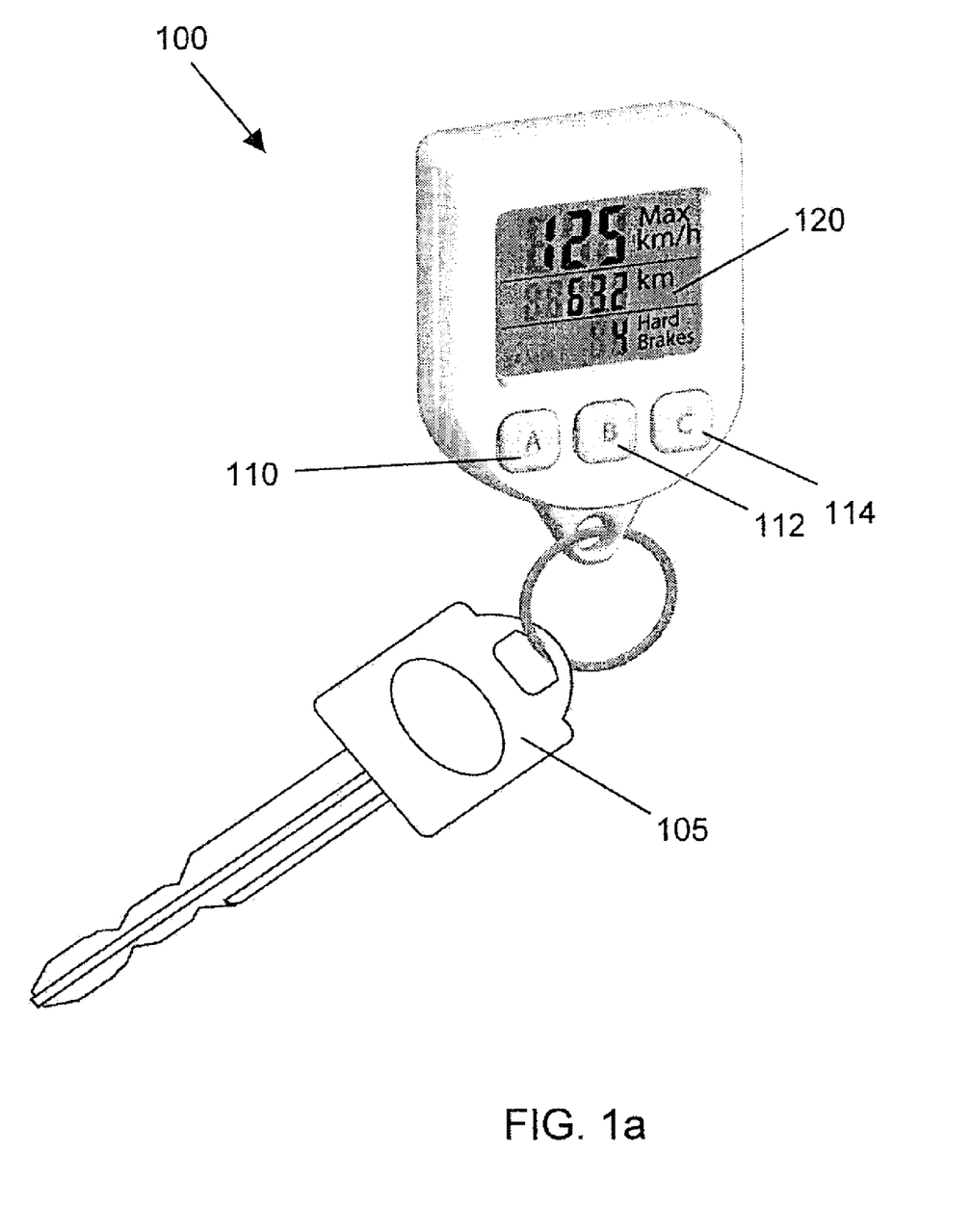
FIG. 1A is a diagram of a portable device according to one exemplary embodiment.

Reference is first made to FIG. 1A, which illustrates a portable device 100 according to one exemplary embodiment of the invention. The portable device 100 includes a display 120, for displaying vehicle statistics, and three input buttons 110, 112, and 114, for receiving input from the user. In this illustration, the portable device 100 is removably attachable to the key 105 used to operate the vehicle to be monitored. For example, the portable device may comprise a loop for mounting to a key ring.

The input buttons 110, 112, and 114 have a variety of functions. The first button 110 is a synchronization button. If the synchronization button 110 is pressed and released then the display 120 will toggle between a metric mode and an imperial mode. If the synchronization button 110 is held for at least three seconds then the display 120 will toggle between a main mode and a synchronization mode. The synchronization mode will be discussed in further detail with reference to FIG. 5.

The second button 112 is a reset button. If the reset button 112 is pressed and released, the portable device 100 will request updated vehicle statistics from a sensor unit 150. If the reset button 112 is held for at least three seconds then the portable device 100 will enter a reset mode. The reset mode will be discussed in further detail with reference to FIG. 7. From the reset mode, the reset button 112 allows an access code to be entered.

The last button 114 is a code button. The code button 114 will cause the portable device 100 to enter into a change code mode when held for at least three seconds. The change code mode will be discussed in greater detail with reference to FIG. 6. Once in the change code mode, the reset button 112 can be used to increment each digit and the code button 114 is used to confirm the digits that are selected. The current code must be entered using the reset and code buttons before the code can be changed. Once the current code has been verified, the new code can be entered. The code allows the user to access certain functions on the portable device 100 and provides a level of security.

Figure 1B:
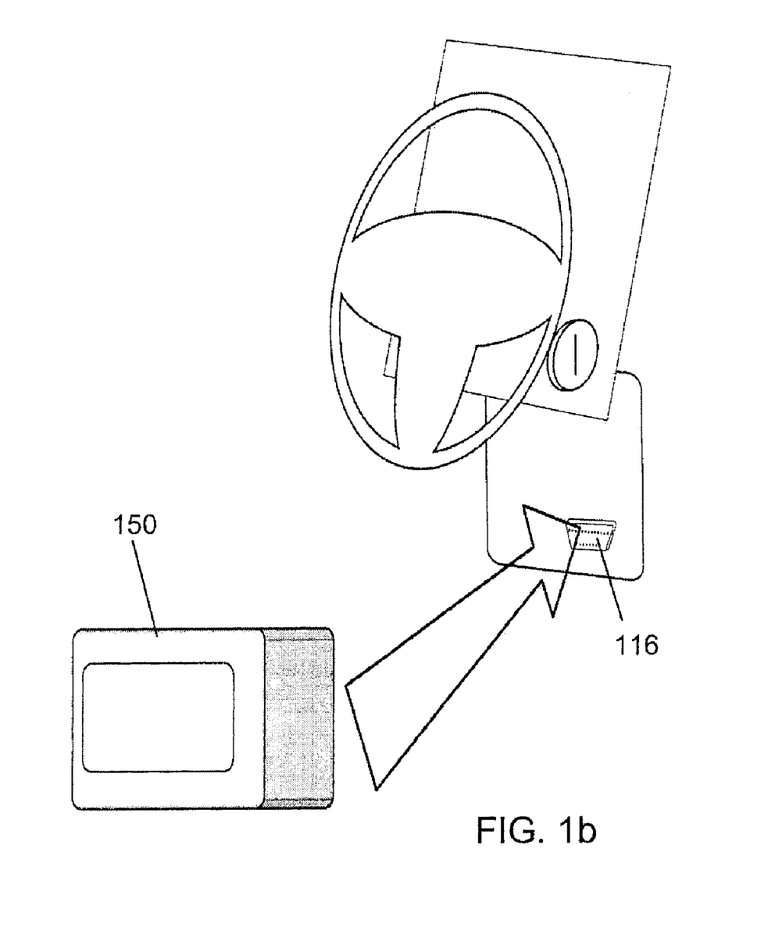
FIG. 1B is a diagram showing a sensor unit according to one exemplary embodiment being attached to a vehicle.

Referring now to FIG. 1B, a sensor unit 150 is shown which is releasably attachable to a port 116 of the vehicle to be monitored. In this embodiment, the port 116 is an OBD-II port but other embodiments can use other technology and techniques which allow for the collection of vehicle statistics, such as accelerometers, speedometers or GPS systems and the like.

Figure 1C:
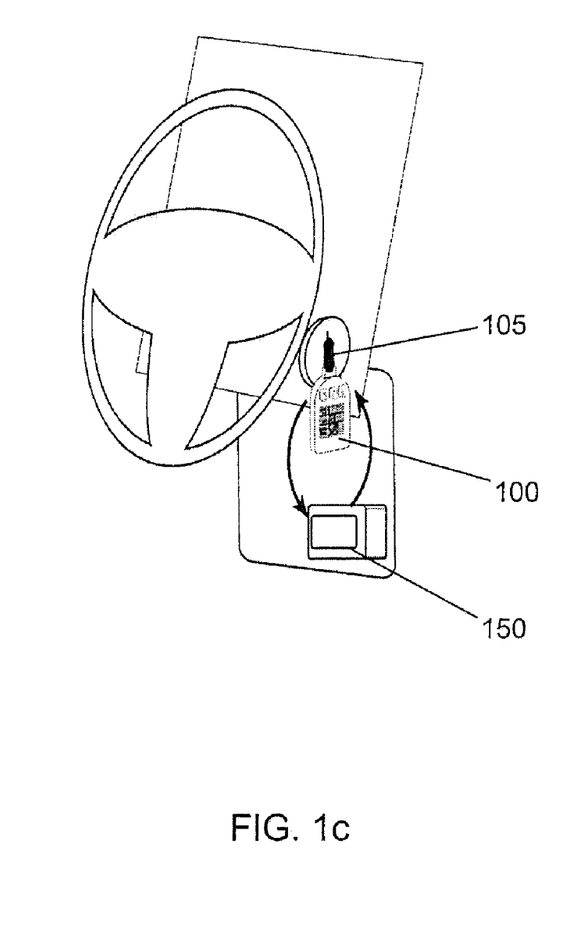
FIG. 1C is a diagram showing the portable device of FIG. 1A and the sensor unit of FIG. 1B in use.

Referring now to FIG. 1C, the sensor unit 150 is shown attached to the OBD-II port 116 of the vehicle. The sensor unit 150 communicates with the portable device 100 which is releasably attachable to the vehicle key 105.

Figure 2:
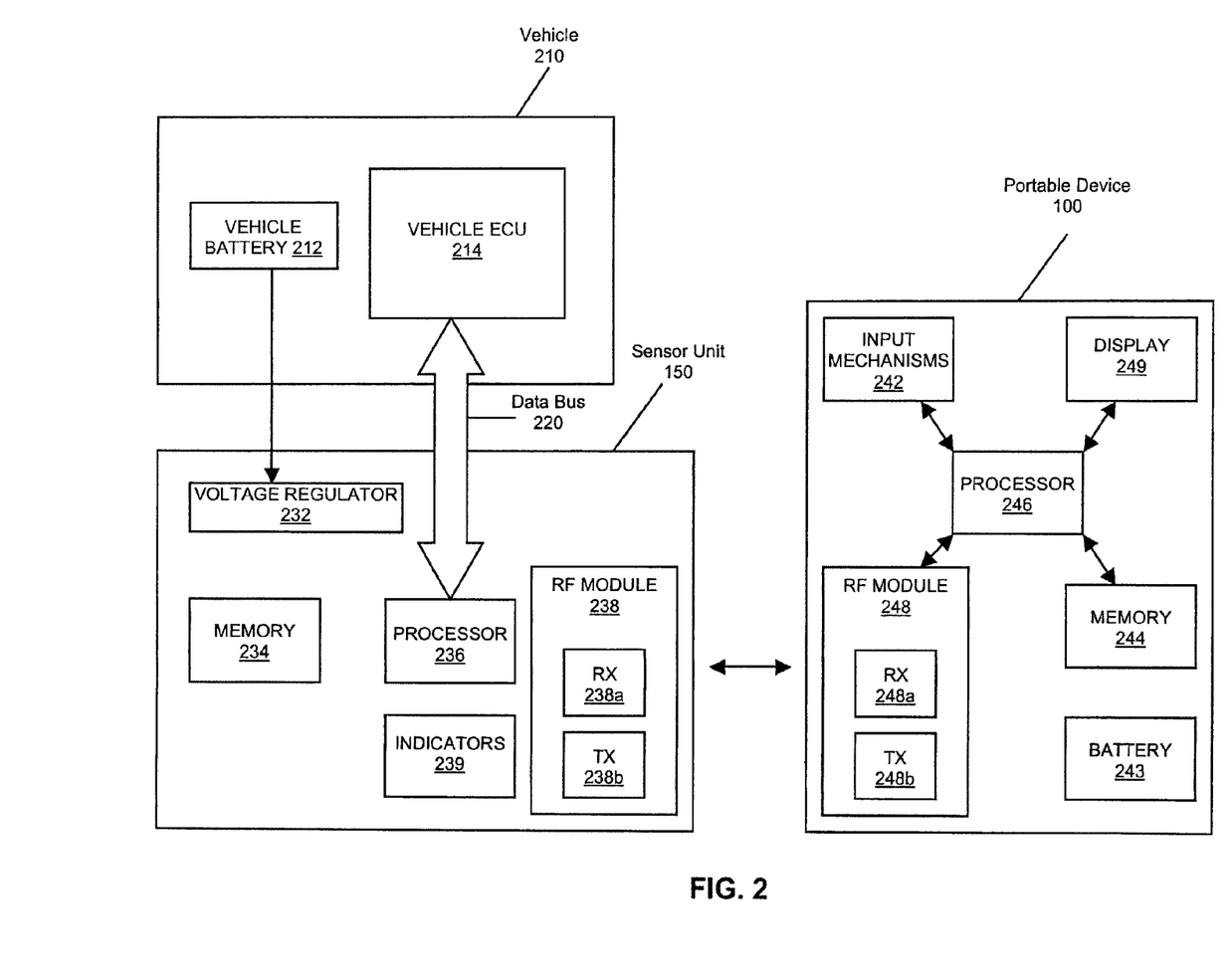
FIG. 2 is a block diagram of a vehicle monitoring system.

Reference will now be made to FIG. 2 which illustrates the components for an exemplary embodiment of a vehicle monitoring system 200. The vehicle monitoring system 200 includes the portable device 100 and the sensor unit 150 which communicates with the monitored vehicle 210 through data bus 220. The portable device 100 and the sensor unit 150 communicate using two radio frequency (RF) modules 248 and 238.

The vehicle 210 includes, among many other components, a vehicle battery 212 and a vehicle engine control unit (ECU) 214. The vehicle battery 212 can be used to provide power to the sensor unit 150. The vehicle ECU 214 captures vehicle information and responds to information requests from the sensor unit 150. The sensor unit 150 will continually query the vehicle ECU 214 for the current speed of the vehicle 210 through the data bus 220.

The sensor unit 150 connects to the type A vehicle connector of the vehicle 210 as specified in the SAE J1962 standard. The sensor unit 150 includes, but is not limited to, a voltage regulator 232, a memory 234, a processor 236, two indicators 239 and an RF module 238.

As mentioned above, the RF module 238 is used to communicate with the portable device 100. The RF module 238 consists of receiver circuitry 238a (RX) and transmitter circuitry 238*b* (TX). The indicators 239 inform the user of the state of the sensor unit 150 (i.e. if it is functional). The indicators may be light-emitting diodes (LEDs) or the like. The memory 234 is a nonvolatile memory, such as an EEPROM, used to store statistics and data in case power is removed from the sensor unit 150. The processor 236, such as a microcontroller unit (MCU), controls the operations of the sensor unit 150. Finally, the voltage regulator 232 connects to the vehicle battery 212. The voltage regulator 232 drops the 12 volts supplied by the vehicle battery to 5 volts needed by the sensor unit 150.

The portable device 100 may be a key fob unit, similar to a car starter key fob, or any other portable device. It includes, but is not limited to, a group of input mechanisms 242, a battery 243, a memory 244, a processor 246, an RF module 248 and a display 249.

As mentioned above, the RF module 248 is used to communicate with the sensor unit 150. The RF module 248 consists of receiver circuitry 248*a* (RX) and transmitter circuitry 248*b* (TX). The input mechanisms 242 such as input buttons, are used by the user to enter information or change settings on the portable device 100. The display 249 displays information to the user, including, but not limited to, vehicle statistics. The memory 244 is a nonvolatile memory, such as an EEPROM, used to store statistics and data in case power is removed from the portable device 100. The processor 246 controls the operations of the portable device 100. Finally, the battery 243 provides power to the portable device 100.

The sensor unit 150 will normally remain attached to the vehicle 210 while the portable device 100, which contains the same vehicle statistics as the sensor unit 150, may be easily transported to and from the vehicle 210. That is, the sensor unit 150 may be mounted to the vehicle, and may remain mounted to the vehicle over the life of the vehicle or over a portion of the life of the vehicle. That is, the user does not need to attach the sensor unit 150 to the vehicle each time the vehicle monitor is used. Rather, the user may attach the sensor unit 150 to the vehicle the first time the vehicle monitor is used, and may leave the sensor unit 150 attached to the vehicle indefinitely. For example, the user may leave the sensor unit 150 attached to the vehicle until repair to the sensor unit 150 is required, or until it is desired to use the sensor unit 150 in another vehicle. Alternately, the sensor unit 150 may be attached to the vehicle during manufacture or assembly of the vehicle, and accordingly, the user may not need to attach the sensor unit 150 to the vehicle at all.

Since the portable device 100 is portable and may be easily removed from the vehicle, the driving habits of a driver may be monitored without the need to enter the vehicle 210 or even to be in proximity of the vehicle 210. Since the sensor unit 150 normally remains attached to the vehicle 210, there is no possibility that a driver will mistakenly forget to attach it prior to operating the vehicle 210. Even if the portable device is not in proximity of the vehicle 210 when the vehicle is being operated, for example if the portable device is left at home, the sensor unit 150 will continue to collect statistics. In some embodiments, the portable device 100 may be removably attached to the keys used to operate the vehicle 210 or to any other object or personal item but preferably to an object which would normally accompany a driver in the vehicle 210. Attaching the portable device 100 in such a way reduces the likelihood that the vehicle 210 will mistakenly be operated without the portable device 100 being present, thus increasing the likelihood that the statistics displayed on the portable device will be up to date. Alternatively, the portable device 100 may be placed in a wallet or purse or similar personal item. As the vehicle statistics are displayed on the portable device 100 itself, there is no need for any other equipment, such as a personal computer, to monitor the usage of the vehicle 210.

Figure 3:
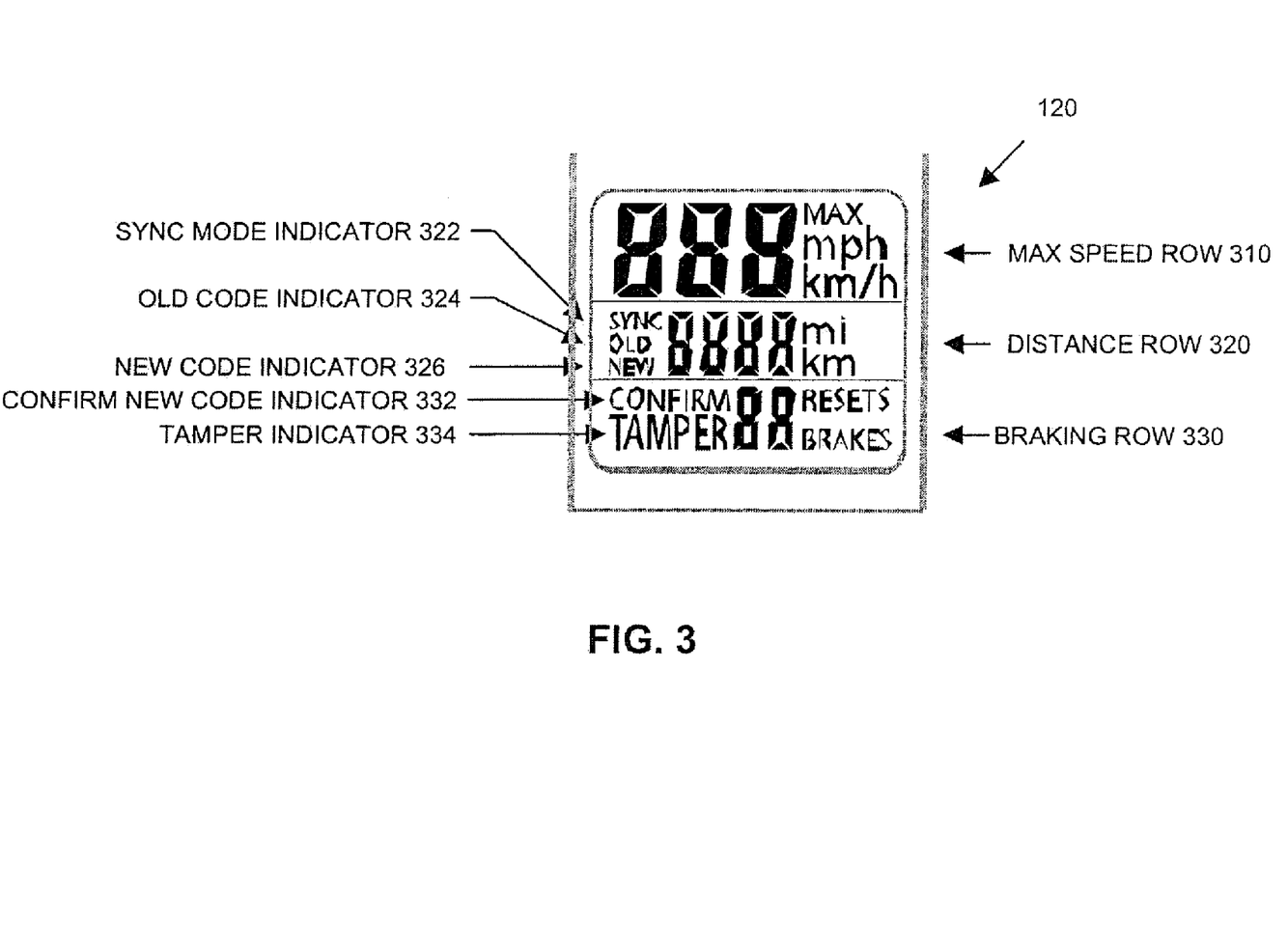
FIG. 3 is a diagram showing a display of the portable device of FIG. 1A.

Reference will now be made to FIG. 3 which illustrates the display 120 of the portable device 100 in more detail. The display includes several fields of information. In the exemplary embodiment, there are three fields including a maximum speed field 310, a distance field 320 and a braking field 330.

The maximum speed field 310 displays the maximum speed which the vehicle 210 has attained since the last time the portable device 100 was reset. The maximum speed may be displayed in metric (km/h) or imperial (mph) depending on the display mode of the portable device 100.

The distance field 320 displays the distance the vehicle 210 has traveled since the last time the portable device 100 was reset. The distance may be displayed in metric (km) or imperial (mi) depending on the display mode of the portable device 100. The distance field 320 also includes three indicators 322, 324 and 326. The sync mode indicator 322 is present when the portable device 100 is in synchronization mode. The old code indicator 324 is present during a change code operation to indicate that the old access code is to be entered. The new code indicator 326 is present during a change code operation to indicate that the new access code is to be entered.

The braking field 330 displays the number of times that a driver of the vehicle 210 has slammed on the brakes since the last time the portable device 100 was reset. This may be calculated by keeping track of the number of times in which the vehicle 210 has experienced a specified reduction in speed in a specified period of time. When the reset button 112 is held for at least three seconds then the braking field 330 will display the number of times that the portable device 100 has been reset. The braking field 330 also includes two indicators 332 and 334. The confirm new code indicator 332 is present during a change code operation to indicate that a new access code needs to be confirmed. The tamper indicator 334 indicates that tampering has been detected.

Figure 4:
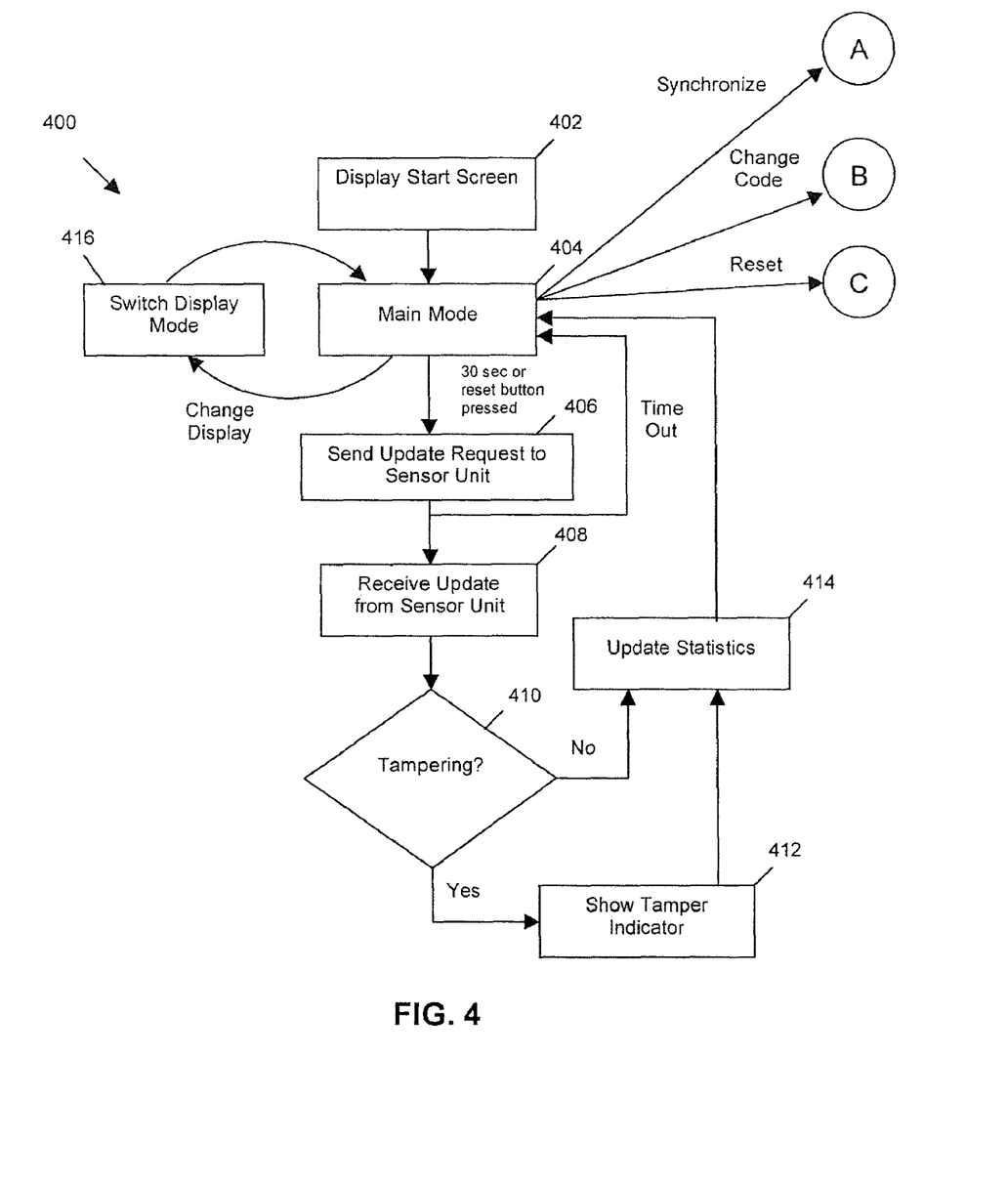
FIG. 4 is a flowchart diagram illustrating the steps for an exemplary embodiment of a method used to display and update vehicle statistics on the portable device.

Referring now to FIG. 4, there is shown a flowchart diagram that illustrates a method 400 used to display and update vehicle statistics on the portable device 100. The method 400 starts at step 402 where the portable device 100 is first initiated and a start screen is displayed. The method 400 then proceeds to step 404 where the portable device 100 enters the main mode in which it waits to receive input from the user or for 30 seconds to pass with no input from the user.

The portable device 100 will remain in the main mode until 30 seconds passes or until it receives input from the user. If the user presses the synchronization button 110 for less than three seconds, the method 400 proceeds to step 416 where the display mode will be changed from metric to imperial or from imperial to metric. If the synchronization button 110 is pressed for three seconds or more, the portable device 100 will enter the synchronization mode which will be discussed in relation to FIG. 5. If the code button 114 is pressed for at least three seconds, the portable device 100 will enter the change code mode which will be discussed in relation to FIG. 6. If the reset button 112 is pressed for three seconds or more then the portable device 100 will enter the reset mode which will be discussed in relation to FIG. 7. If the reset button 114 is pressed for less than three seconds or if 30 seconds passes without any user input, the method 400 will proceed to step 406 to get updated vehicle statistics from the sensor unit 150.

At step 406, the portable device 100 requests an update from the sensor unit 150. If no response is received within a certain period of time (i.e., within 20 ms) then the portable device 100 times out, the receiver circuitry 248*a* of the RF module 248 shuts down to conserve energy and the method 400 returns to the main mode in step 404.

As will be discussed in relation to FIG. 5, each portable device 100 has a unique device identification number and each sensor unit 150 has a sensor identification number which matches the device identification number of the portable device 100 to which it has been synchronized. The portable device 100 will include its device identification number in each update request sent to the sensor unit 150 and the sensor unit 150 will only respond to update requests containing a matching identification number. This fact, along with the short time out period, means that the sensor unit 150 does not need to send its sensor identification number with each update message. This provides for shorter update messages from the sensor unit 150 and, hence, shorter response times which allows the portable device 100 to use an even shorter time out period and increases the life of the battery 243.

If a message is sent from the sensor unit 150 before the portable device 100 times out then the method 400 proceeds to step 408. At step 408, the portable device 100 receives an update message from the sensor unit 150. This update message will include each of the statistics displayed on the portable device 100.

The sensor unit 150 will keep a power cycle count of the number of times it has been powered up (i.e. the number of times it has been connected to the vehicle; also called a sensor power cycle count). This information will be sent to the portable device 100 each time an update message is sent. The portable device 100 will store the power cycle count received in the first message after the initial installation of the sensor unit or the most recent reset operation (also called a base power count). That is, when the sensor unit 150 is first plugged in, the sensor power cycle count is at a value of one. The portable device will initially request and receive the sensor power cycle count at least a first time, setting a base power cycle count value of one. Then, at a later time, the portable device will request and receive the sensor power cycle count at least a second time, and, later, at least a third time and so forth. If the sensor unit has remained plugged into the vehicle then the sensor power cycle count is expected to be the same as the base power cycle count. For example, if the sensor unit has not been unplugged, the base power cycle count and the updated power count are both at a numerical value of one. As shown at step 410, the power cycle count received from the sensor unit 150 will be compared to the power cycle count stored in the portable device 100. For example, the portable device will compare the first count received the first time to the most recent power count received from the sensor unit 150, such as the count received the second time or third time etc. (ie. the sensor unit power cycle count numerical value is compared to the base power cycle count numerical value). If the sensor has not been unplugged after being initially plugged in, the base power cycle count and the updated power count will match and both have a numerical value of one. If the two counts do not match, it is assumed that someone has removed the sensor 150 from port 116 and driven the vehicle 210 without the use of the sensor 150. This is considered to be tampering and, hence, the tamper indicator 334 is shown at step 412. For example, if the sensor unit has been unplugged after its initial insertion, the sensor power cycle count will become two and the base power cycle count will still be one and the counts will not match. The tamper indicator 334 will be displayed until the portable device 100 is reset as will be described with reference to FIG. 7. The method 400 then proceeds to step 414. If the two counts do match, on the other hand, the method 400 proceeds directly to step 414. After the portable device is reset, the current sensor power cycle count, once transmitted to the portable device, becomes the new base power cycle count. Typically, the sensor power cycle count is cumulative, so that even if the portable device is reset, the sensor power cycle count is not reset. For example, if sensor unit is initially plugged in, the base power count will be one. If the sensor has been unplugged repeatedly so that the sensor unit has a power cycle value of 5, then after resetting the portable device, the base power cycle count becomes 5.

At step 414, the statistics on the display 120 of the portable device 100 and in memory 244 are updated and the portable device 100 returns to the main mode at step 404.

Figure 5:
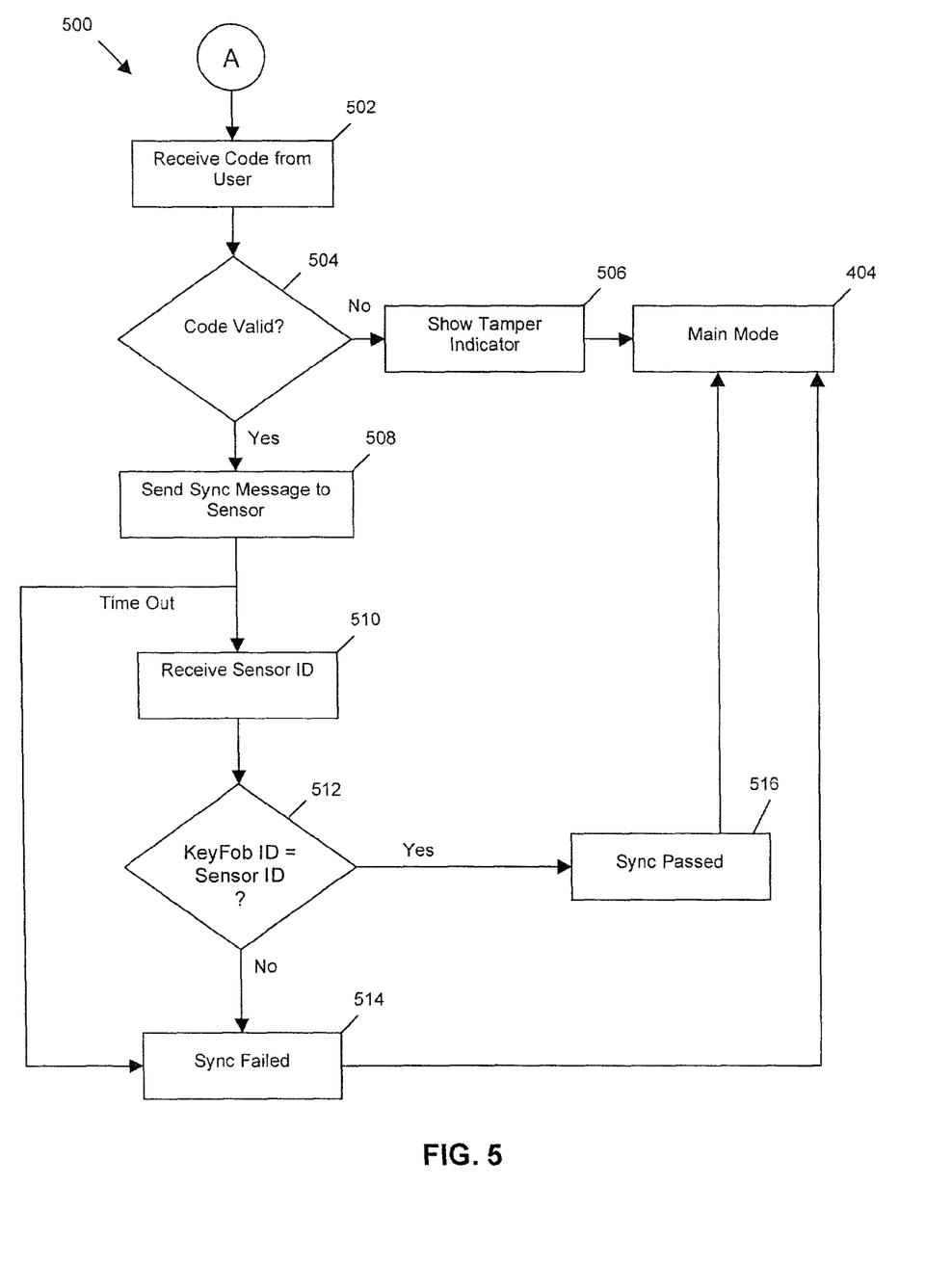
FIG. 5 is a flowchart diagram illustrating the steps for an exemplary embodiment of a method used to synchronize the portable display with the sensor unit.

Referring now to FIG. 5, there is shown a flowchart diagram which illustrates an exemplary embodiment of a method 500 used to synchronize the portable device 100 with the sensor unit 150. There are two main purposes of synchronization. First, synchronization is used to avoid interference between sensor units and portable devices from different systems (i.e. so that a user will not mistakenly read vehicle information from the sensor unit of a neighboring vehicle or purposefully read the statistics from a sensor unit with more "acceptable" values. Second, synchronization makes it difficult for data to be retrieved from the sensor unit 150 without the associated portable device 100, allowing the data to remain private from unauthorized persons. Synchronization is required when installing the sensor for the first time.

The method 500 is initiated when the portable device 100 enters the synchronization mode. At this point, the sync mode indicator 322 is activated. At step 502, the portable device 100 receives an access code from the user. The validity of this access code is checked at step 504. If it is not a valid code, the tamper indicator 334 is activated at step 506 and the portable device 100 returns to the main mode at step 404. If a valid code has been entered, the method 500 proceeds to step 508 to attempt a synchronization.

At step 508, the portable device 100 sends a synchronization message to the sensor unit 150. As mentioned above, each portable device 100 has a unique device identification number that can be factory set or randomly generated when user enters the synchronization mode. If the sensor unit 150 is prepared to synchronize, it receives the device identification number from the portable device 100 in the synchronization message and this number becomes the sensor identification number. The sensor unit 150 then sends a message back to the portable device 100 including its newly set sensor identification number. If the sensor unit is not prepared to synchronize, no message is sent back from the sensor unit 150, the portable device times out, the synchronization fails and a fail message appears on the display 120 at step 514. The method 500 returns to the main mode in step 404. The sensor unit 150 and the portable device 100 will not be able to communicate until a synchronization has been successful.

At step 512, the sensor identification number received from the sensor unit 150 is compared to the portable device's 100 device identification number. If they are equal, the synchronization has passed. At step 516, a pass message appears on the display 120 and the portable device 100 returns to the main mode at step 404. If the two identification numbers are not equal, the synchronization fails and a fail message appears on the display 120 at step 514. The method 500 returns to the main mode in step 404. The sensor unit 150 and the portable device 100 will not be able to communicate until a synchronization has been successful.

Figure 6:
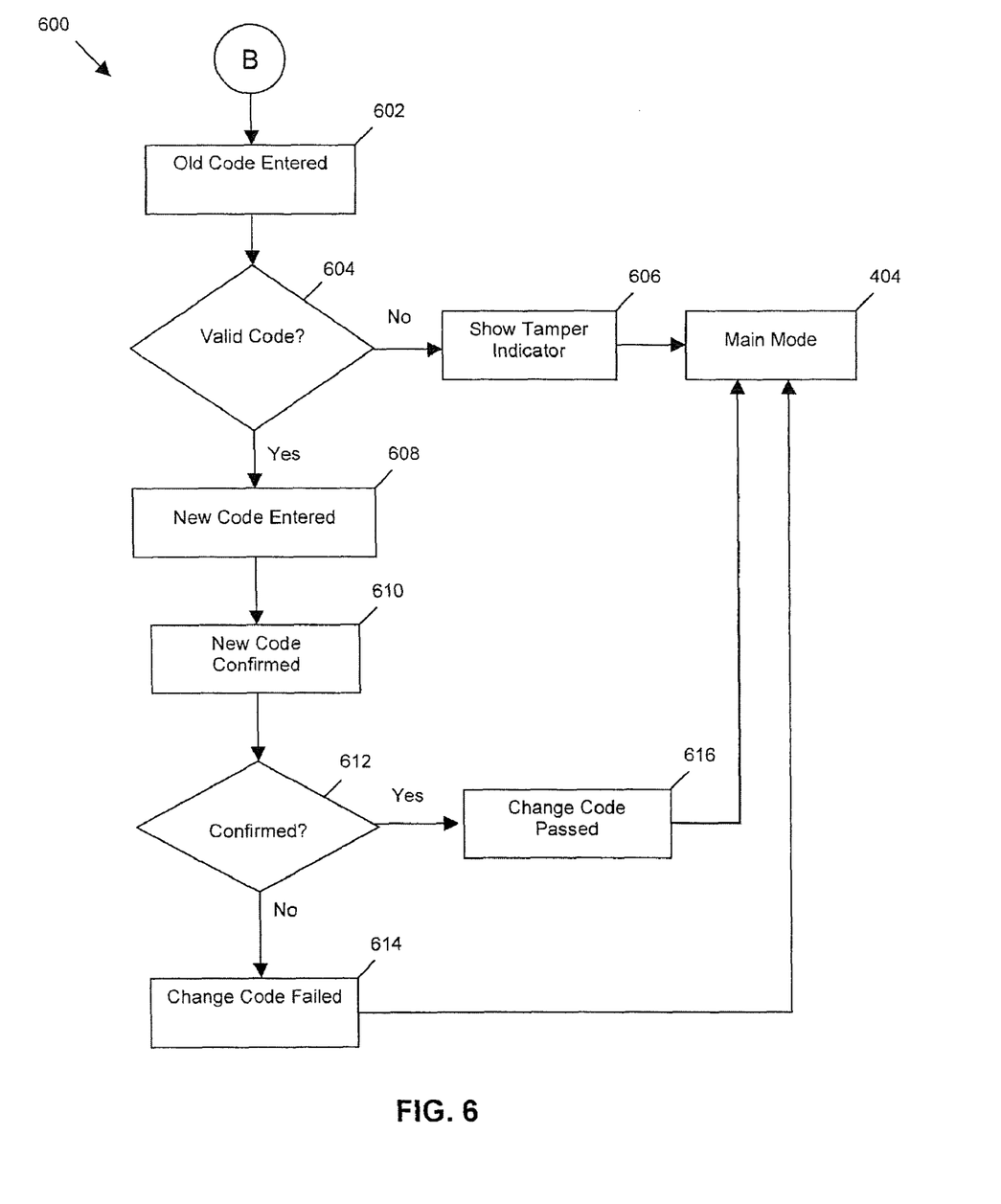
FIG. 6 is a flowchart diagram illustrating the steps for an exemplary embodiment of a method used to change the access code on the portable display.

Referring now to FIG. 6, there is shown a flowchart diagram that illustrates an exemplary embodiment of a method 600 used to change the access code on the portable device 100. The method 600 is initiated when the portable device 100 enters the change code mode. The access code is required each time the information stored and displayed on the portable device 100 is reset. This code is initialized during manufacture and can be changed thereafter. An authorized user may wish to change this access code initially to prevent unauthorized users from resetting the portable device and then periodically or whenever it is suspected that an unauthorized user may have discovered the current access code in order to ensure the integrity of the information.

At step 602, the old code indicator is activated and the portable device 100 receives the old access code from the user. The validity of this access code is checked at step 604. If it is not a valid code, the tamper indicator 334 is activated at step 606 and the portable device 100 returns to the main mode at step 404. If a valid code has been entered, the method 600 proceeds to step 608.

At step 608, the new code indicator 326 is activated and a new access code is entered. At step 610, both the new code indicator 326 and the confirm new code indicator 332 are activated and the new code is entered for a second time in order to confirm the new access code. If the same code is entered in steps 608 and 610 then the new code is confirmed at step 612 and the method 600 proceeds to step 616. At step 616, the access code is changed to the new access code, a pass message is displayed on the display 120 and the portable device 100 returns to the main mode at step 404. If the same code is not entered in steps 608 and 610 then the code is not confirmed at step 612 and the method 600 proceeds to step 614. At step 614, a fail message is displayed on the display 120 and the portable device 100 returns to the main mode at step 404 without having changed the access code.

Figure 7:
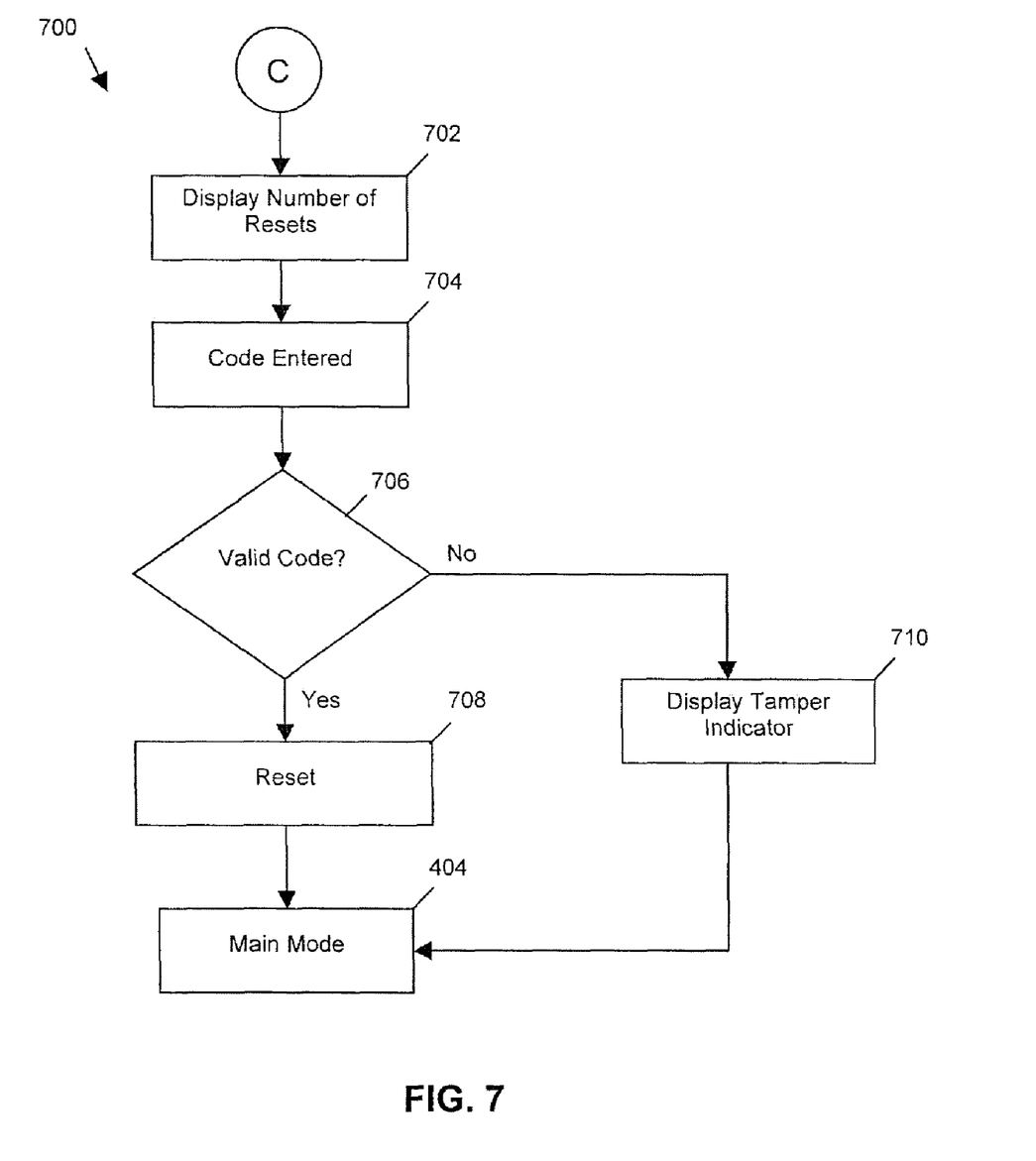
FIG. 7 is a flowchart diagram illustrating the steps for an exemplary embodiment of a method used to reset the memory on the portable device.

Referring now to FIG. 7, there is shown a flowchart diagram which illustrates an exemplary embodiment of a method 700 used to reset the portable device 100. The method 700 is initiated when the portable device 100 enters the reset mode. A user may want to reset the portable device 100, for example, each time a different driver uses the vehicle 210 in order to get driver-specific information.

At step 702, the number of resets is displayed in the braking field 330 of display 120. At step 704, the portable device 100 receives an access code from the user. The validity of this access code is checked at step 706. If it is not a valid code, the tamper indicator 334 is activated at step 710 and the portable device 100 returns to the main mode at step 404. If a valid code has been entered, the method 700 proceeds to step 708. At step 708, the statistics shown on the display 120 are reset to zero as are the values stored in memory 244 and the number of resets is increased by one.

The portable device 100 stores a reset identification number which toggles between 0 and 7 for each reset. Each time the portable device 100 sends an update request to the sensor unit 150 (step 406 of FIG. 4), it includes the reset identification number in the message. When the sensor unit 150 receives the update request, it will compare the reset identification number it receives with the message to the reset identification number it received in the most recent prior message. If the two values are different, the sensor unit 150 also resets its statistics. In order to ensure that the portable device 100 is always synchronized with the sensor unit 150, once the portable device 100 has been reset further resets are only permitted after a message has been successfully received by the portable device 100 from the sensor unit 150.

Once the portable device 100 has been successfully reset, the method 700 returns to the main mode at step 404.

Figure 8:
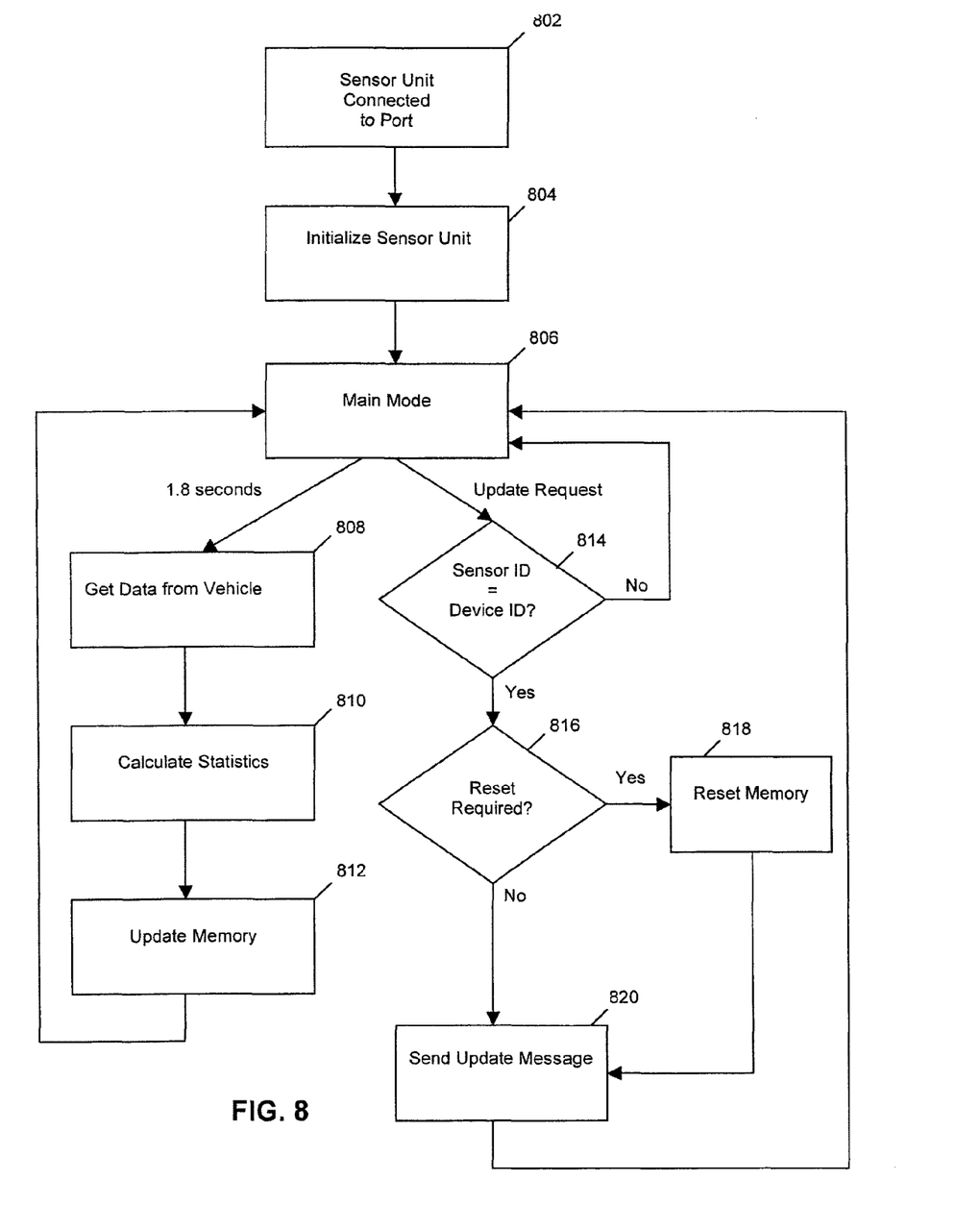
FIG. 8 is a flowchart diagram illustrating the steps for an exemplary embodiment of a method used to retrieve vehicle statistics from the vehicle, store them in the sensor unit and send updated vehicle statistics to the portable device.

Referring now to FIG. 8, there is shown a flowchart diagram that illustrates the method 800 used to retrieve vehicle statistics from the vehicle 210, store them in the sensor unit 150 and send updated vehicle statistics to the portable device 100. The method 800 is initialized when the sensor unit 150 is attached to port 116.

At step 804, the sensor unit 150 is initialized. This includes incrementing the power cycle count used in step 410 of FIG. 4 to determine if the vehicle has been driven without the use of the sensor unit 150 as described above with reference to FIG. 4.

After the sensor unit 150 has been initialized, it enters a main mode at step 806. In the main mode, the sensor unit 150 waits until 1.8 seconds passes or until an update request is received from the portable device 100. If 1.8 seconds passes in the main mode without an update request from the portable device 100, the sensor unit 150 collects the vehicle statistic. That is, the sensor unit 150 polls the vehicle for vehicle data, including the current speed, at step 808.

At step 810, the sensor unit 150 calculates the vehicle statistics based on the new current speed (or other vehicle data), and optionally based on the new current speed and a previously stored statistic. For instance, if the new current speed is greater than the maximum speed stored in the sensor unit 150, then the sensor unit 150 sets the maximum speed to the new current speed it just received from the vehicle 210. Similarly, the sensor unit stores a distance value which is a running sum calculated by summing the current velocity divided by two (distance$_m$=distance$_{m-1}$+velocity$_{km/h}$/2). The formula for the distance value is derived from the formula distance$_m$=velocity$_{km/h}$*1.8$_s$/3600$_{s/h}$*1000$_{m/km}$=velocity$_{km/h}$/2$_{m/km/h}$. The number of hard brakes is incremented each time the vehicle 210 experiences a specified reduction in speed in a specified period of time. In one embodiment to determine the number of applications of hard brakes by the driver, the sensor compares the current speed to the speed stored in the memory of the sensor unit. If the difference between the current speed and the stored speed is at or above a certain amount, for example 25 km/hr (or if the difference falls in a range, such as 20-30 km/hr or optionally 23-27 km/hr) and since the time difference between the most recent poll for data and the last poll for data is fixed, for example 1.8 s, the sensor determines that a hard brake has occurred, as the vehicle has experienced a rapid deceleration. For example, a decrease of 25 km/hr in 1.8 seconds is a deceleration of approximately 14 km/hr in one second. Other ranges to identify rapid decearation be readily apparent, such as a deceleration of 11-17 km/hr/sec or 12-16 km/hr/sec. After detecting hard braking, the sensor then updates the hard brake count in the memory by an increment of one and this increase is subsequently displayed on the portable device. Other statistics, such as the average speed, the number of rapid accelerations and the maximum revolutions per minute (RPMs) can be determined, either based on the new current speed or from other vehicle data received from the vehicle 210 at step 808. The portable device optionally also displays one or more of average speed, the number of rapid accelerations and the maximum RPMs.

At step 812, the memory 234 is updated with the statistics calculated at step 810. Once the memory 234 has been updated, the method 800 returns to step 806 where the sensor unit 150 returns to the main mode of operation. Accordingly, during operation of the vehicle, the sensor unit 150 repeatedly and periodically polls the vehicle 210 for data, calculates the vehicle statistic, and updates the memory 234 of the sensor unit 150 until an update request is received from the portable device. Accordingly, the memory of the sensor unit generally always contains real-time and up-to-date vehicle statistics. For example, if the sensor unit 150 polls the vehicle 210 for data, calculates the vehicle statistic, and updates the memory 234 of the sensor unit 150 every 2 seconds or less, for example every 1.8 seconds, the vehicle statistic stored in the memory 234 will be up-to-date within 1.8 seconds.

When a request for updated statistics is received from the portable device 100, the method 800 proceeds to step 814. The portable device 100 may be configured to request the updated statistics periodically and repeatedly. Further, the portable device 100 may be configured to request the updated statistics automatically. For example, as mentioned hereinabove, the portable device may be configured to automatically request the updated statistics every 15-120 seconds, and more specifically every 30 seconds. By requesting the updated statistics periodically every 30 seconds, the battery of portable device may be conserved. The update request will include the device identification number of the portable device 100. At step 814, the device identification number included in the update request will be compared with the sensor identification number of the sensor unit 150. If the two device identification numbers do not match, the method 800 returns to step 806.

If the device identification number from the update request matches the sensor identification number of the sensor unit 150 then the method 800 proceeds to step 816. As mentioned with regard to FIG. 7, the portable device 100 stores a reset identification number which toggles between 0 and 7 for each reset. Each time the portable device 100 sends an update request to the sensor unit 150 (step 406 of FIG. 4), it includes the reset identification number in the message. When the sensor unit 150 receives the update request, it will compare the reset identification number it receives with the message to the reset identification number it received in the most recent prior message at step 816. If the two values are different, the sensor unit 150 resets the statistics in the memory 234 at step 818.

At step 820, a message including the updated statistics is sent to the portable device 100. The method 800 then returns to step 806. Accordingly, as the sensor unit 150 repeatedly and periodically polls the vehicle 210 for data, calculates the vehicle statistic, and updates the memory 234 of the sensor unit during operation of the vehicle, when the portable device 100 receives the statistics, it receives real-time and up-to-date statistics, and displays real-time and up-to-date vehicle statistics.

The embodiments of the methods described above may be implemented in hardware or software, or a combination of both. However, these embodiments are typically implemented in computer programs executing on programmable devices. Program code is applied to input data to perform the functions described herein and generate output information. The output information is applied to one or more output devices, in known fashion.

Each program is implemented in a high level procedural or object oriented programming and/or scripting language. However, the programs can be implemented in assembly or machine language, if desired. In any case, the language may be a compiled or interpreted language.

While certain features of the various embodiments described herein have been illustrated and described herein, many modifications, substitutions, changes, and equivalents will now occur to those of ordinary skill in the art. It is, therefore, to be understood that the appended claims are intended to cover all such modifications.

The invention claimed is:

1. A method for monitoring a vehicle during operation, the method comprising:
   polling the vehicle for vehicle data using a sensor unit provided to the vehicle;
   calculating a vehicle statistic from the vehicle data using the sensor unit;
   updating a memory of the sensor unit with the vehicle statistic;
   repeating the polling, calculating and updating steps periodically during operation of the vehicle;
   wirelessly requesting and receiving the vehicle statistic from the memory using a processor provided in a portable device;
   displaying the vehicle statistic on a display provided in the portable device;
   storing a count of the number of times the sensor unit has been connected to the vehicle;
   requesting and receiving the count at a first time using the portable device;
   requesting and receiving the count at a second time using the portable device;
   comparing the count received at the first and second times using the portable device; and
   displaying a tampering signal if the count received at the first time is not equal to the count received at the second time.

2. The method of claim 1, wherein the polling, calculating and updating steps are repeated every 2.0 seconds or less.

3. The method of claim 1, further comprising automatically repeating the polling, calculating, updating and wirelessly requesting and receiving steps.

4. The method of claim 3, wherein the wirelessly requesting and receiving and displaying the vehicle statistic steps are repeated every 15-120 seconds.

5. The method of claim 1, wherein the calculating step comprises calculating the vehicle statistic from the vehicle data and at least one previously stored vehicle statistic.

6. The method of claim 1, wherein the vehicle data is speed, and the vehicle statistic is at least one of hard brakes, a distance or a maximum speed.

7. The method of claim 1, wherein the wirelessly requesting and receiving step comprises sending a request to the sensor unit together with an identification number of the portable device, and wherein the sensor unit is configured to respond to the request only if it recognizes the identification number.

8. The method of claim 1, wherein the wirelessly requesting and receiving step is carried out wirelessly and automatically.

9. The method of claim 1, further comprising:
   resetting the vehicle statistics to zero on the display on the portable device;
   storing a reset number on the portable device;
   sending the reset number to the sensor unit;
   comparing the reset number to a prior reset number; and
   resetting the memory on the sensor unit if the reset number does not equal the prior reset number.

10. The method of claim 1, wherein the vehicle statistic is displayed on the portable device in real-time.

11. The method of claim 10, wherein the vehicle data is polled less than 2 seconds before the display of the vehicle statistic.

12. A system for monitoring a vehicle, the system comprising:
   a sensor unit configured to collect a vehicle statistic; and
   a portable device comprising:
      a processor configured to request and receive the vehicle statistic from the sensor unit;
      a display configured to display the vehicle statistic; and
      a transceiver configured to wirelessly communicate with the sensor unit;

wherein the processor is configured to store a count of the number of times the sensor unit has been connected to the vehicle, request and receive the count at a first time, request and receive the count at a second time, compare the count received at the first and second times; and display a tampering signal if the count received at the first time is not equal to the count received at the second time.

13. The system of claim 12, wherein the sensor unit is configured to collect the vehicle statistic by polling the vehicle for vehicle data, calculating the vehicle statistic from the vehicle data, and storing the vehicle statistic.

14. The system of claim 13, wherein the sensor unit is configured to continuously repeat polling the vehicle for vehicle data, calculating the vehicle statistic from the vehicle data, and storing the vehicle statistic.

15. The system of claim 12, wherein the sensor unit is fixedly attachable to the vehicle, and the portable device is in wireless communication with the sensor device and removable from the vehicle.

16. The system of claim 15, wherein the portable device is removably attached to a key used to operate the vehicle.

17. The system of claim 16, wherein the portable device is a key fob that comprises a loop for mounting to a key and/or a key ring.

18. The system of claim 12, wherein the display is configured to display the vehicle statistic in real-time.

19. A method for monitoring a vehicle during operation, the method comprising:
   polling the vehicle for vehicle data using a sensor unit provided to the vehicle;
   calculating a vehicle statistic from the vehicle data using the sensor unit;
   updating a memory of the sensor unit with the vehicle statistic;
   repeating the polling, calculating and updating steps periodically during operation of the vehicle;
   wirelessly requesting and receiving the vehicle statistic from the memory using a processor provided in a portable device; and
   displaying the vehicle statistic on a display provided in the portable device;
and when a reset is performed, the method further comprises:
   resetting the vehicle statistics to zero on the display on the portable device;
   storing a reset number on the portable device;
   sending the reset number to the sensor unit;
   comparing the reset number to a prior reset number; and
   resetting the memory on the sensor unit if the reset number does not equal the prior reset number.

20. A system for monitoring a vehicle, the system comprising:
   a sensor unit configured to collect a vehicle statistic
   a portable device comprising:
      a processor configured to request and receive the vehicle statistic from the sensor unit;
      a display configured to display the vehicle statistic; and
      a transceiver configured to wirelessly communicate with the sensor unit,
wherein when a reset command is received at the portable device to reset the vehicle statistic, the processor is configured to reset the vehicle statistic to zero on the display on the portable device, store a reset number on the portable device, send the reset number to the sensor unit, compare the reset number to a prior reset number; and reset the memory on the sensor unit if the reset number does not equal the prior reset number.

* * * * *